US012682711B2

(12) United States Patent
Fox et al.

(10) Patent No.: US 12,682,711 B2
(45) Date of Patent: Jul. 14, 2026

(54) INTELLIGENT ACCESS CONTROL SYSTEM

(71) Applicant: INTERNATIONAL BUSINESS MACHINES CORPORATION, Armonk, NY (US)

(72) Inventors: Jeremy R. Fox, Georgetown, TX (US); Suman Patra, Kolkata (IN); Logan Bailey, Atlanta, GA (US); Zachary A. Silverstein, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 18/587,933

(22) Filed: Feb. 26, 2024

(65) Prior Publication Data

US 2025/0273029 A1 Aug. 28, 2025

(51) Int. Cl.

| | |
|---|---|
| ***G07C 9/28*** | (2020.01) |
| ***G07C 9/20*** | (2020.01) |
| ***G07C 9/21*** | (2020.01) |

(52) U.S. Cl.
CPC ................. *G07C 9/28* (2020.01); *G07C 9/21* (2020.01); *G07C 9/215* (2020.01)

(58) Field of Classification Search
CPC . G07C 9/28; G07C 9/21; G07C 9/215; G07C 9/00; G08B 21/02; G06F 19/00
USPC .................................................. 340/5.61, 5.7
See application file for complete search history.

(56) References Cited

U.S. PATENT DOCUMENTS 9,058,702 B2 * 6/2015 Chao ..................... H04W 4/029
9,129,450 B2 * 9/2015 Robertson .......... G07C 9/00904
9,444,805 B1 * 9/2016 Saylor ..................... H04L 63/08
9,697,656 B2 * 7/2017 Trani .................... H04W 4/023
10,089,807 B2 * 10/2018 Plüss ....................... H04W 4/80
10,186,098 B2 * 1/2019 Lingan .................... H04W 4/33
10,297,094 B2 5/2019 Day et al.
10,769,924 B2 * 9/2020 H. Kazerouni .... G06K 7/10297
11,049,346 B2 * 6/2021 Friedli ................ G06V 40/173
11,373,473 B2 6/2022 Biehlmann (Continued)

OTHER PUBLICATIONS

Crawford, J. et al., "Multi-Factor Authentication in Physical Security Environments Using Wireless Identity and Location Tracking," Cisco Systems, Inc. © 2018, IP.com Prior Art Database, Technical Disclosure No. IPCOM000253748D, Apr. 30, 2018, 11 pg.

(Continued)

*Primary Examiner* — Nam V Nguyen
(74) *Attorney, Agent, or Firm* — CHIP LAW GROUP

(57) ABSTRACT

A method, by an intelligent access control system, of implementing access control to a controlled area having a plurality access areas divided by at least one access point includes the following operations. A security token is generated. The security token is transmitted to a client module executing on a client device associated with a first user, and the client module is caused to pair with an access control device associated with the first user. The client module is caused to transfer the security token to the access control device. A physical location of the client device within the controlled area is monitored. A determination is made, by an access control system and based upon the physical location, that the first user is to be revalidated. The client module causes, based upon the determining, the client device to generate an alert.

20 Claims, 3 Drawing Sheets

(56) References Cited

U.S. PATENT DOCUMENTS

| | | | | |
|---|---|---|---|---|
| 11,606,667 | B2 | 3/2023 | Wang | |
| 11,640,462 | B2 | 5/2023 | Shrestha et al. | |
| 11,887,416 | B2 * | 1/2024 | Hoyer | G07C 9/00563 |
| 11,961,344 | B2 * | 4/2024 | Kincaid | G07C 9/00309 |
| 11,995,929 | B2 * | 5/2024 | Verma | G07C 9/00309 |
| 12,315,319 | B2 * | 5/2025 | Shenoi | G06V 40/168 |
| 2014/0375421 | A1 * | 12/2014 | Morrison | H04W 12/065 340/5.61 |
| 2018/0011458 | A1 | 1/2018 | Aggarwal et al. | |

OTHER PUBLICATIONS

"Intelligent Co-Working Spaces Enabled by Smart Building Management, Augmented Reality & IoT," IP.com Prior Art Database, Technical Disclosure No. IPCOM000268377D, Jan. 26, 2022, 5 pg.

"Utilization of Non-Fungible Tokens Persisting on a Permissioned Blockchain in an Edge System to Allow Time-Sensitive Electronic Access Control of a Premises," IP.com Prior Art Database, Technical Disclosure No. IPCOM000271723D, Feb. 3, 2023, 7 pg.

Jansen, W., "Authenticating Mobile Device Users Through Image Selection," The National Institute of Standards and Technology, WIT Transactions on Information and Communication Technologies, Apr. 7, 2004, vol. 30, 10 pg.

"NAC Deployment Guide, Network Admission Control Framework, Deployment Guide," Cisco Systems, Inc. © 1992-2006, Guide C07-332601-00, Feb. 2006, 58 pg.

"Sonicwall Secure Mobile Access 9.0 User Guide," SonicWall Inc. © 2018, 162 pg.

Mell, P. et al., The NIST Definition of Cloud Computing, National Institute of Standards and Technology, U.S. Dept. of Commerce, Special Publication 800-145, Sep. 2011, 7 pg.

* cited by examiner

INTELLIGENT ACCESS CONTROL SYSTEM

BACKGROUND

The present invention relates to access control systems, and more specifically, to an intelligent access control system that leverages mobile devices and access control devices.

Many private areas have access control, in which certain individuals are limited as to the specific areas, whether inside and/or outside, the individual is allowed to travel. Access control systems are oftentimes used in these situations and can take the form of an access control device that allows the possessor of that access control device to unlock a particular access point (e.g., a door). The access control device and access points are controlled by an access control system that associates particular privileges (e.g., location access) to a particular individual via the individual's access control device.

In certain instances, such as when visitor enter a particular location being managed by an access control system, the visitor may receive a temporary access control device and/or be associated with an individual (e.g., a guide) who has their own access control device. Whether intentionally or not, visitors can generate undesirable security breaches to the area under access control. Consequently, there is a need to provide an improved access control system that better control and monitor granularity of access and presence without creating unnecessary obstacles to access.

SUMMARY

A method, by an intelligent access control system, of implementing access control to a controlled area having a plurality access areas divided by at least one access point includes the following operations. A security token is generated. The security token is transmitted to a client module executing on a client device associated with a first user, and the client module is caused to pair with an access control device associated with the first user. The client module is caused to transfer the security token to the access control device. A physical location of the client device within the controlled area is monitored. A determination is made, by an access control system and based upon the physical location, that the first user is to be revalidated. The client module causes, based upon the determining, the client device to generate an alert.

In other aspects, the process includes the security token being regenerated and transmitted to the client module based upon the access control device being used at one of the at least one access point. Also, the transmitting includes transmitting a policy associated with the controlled area to the client module. The determining can be based upon a second user with a second client device being at least a certain distance away from the first client device wherein the first user is a controlling user, and the second user is a controlled user. The determining can also be based upon a time in which the first user is within one of the plurality of access areas. The policy is based upon one of the plurality of access areas in which the first user is located. Additionally, the client module is configured to receive a request to opt into using the intelligent access control system.

An intelligent access control system configured to implement access control to a controlled area having a plurality access areas divided by at least one access point includes a hardware processor configured to perform the following executable operations. A security token is generated. The security token is transmitted to a client module executing on a client device associated with a first user, and the client module is caused to pair with an access control device associated with the first user. The client module is caused to transfer the security token to the access control device. A physical location of the client device within the controlled area is monitored. A determination is made, by an access control system and based upon the physical location, that the first user is to be revalidated. The client module causes, based upon the determining, the client device to generate an alert.

In other aspects, the intelligent access control system includes the security token being regenerated and transmitted to the client module based upon the access control device being used at one of the at least one access point. Also, the transmitting includes transmitting a policy associated with the controlled area to the client module. The determining can be based upon a second user with a second client device being at least a certain distance away from the first client device wherein the first user is a controlling user, and the second user is a controlled user. The determining can also be based upon a time in which the first user is within one of the plurality of access areas. The policy is based upon one of the plurality of access areas in which the first user is located. Additionally, the client module is configured to receive a request to opt into using the intelligent access control system.

A computer program product includes a computer readable storage medium having stored therein program code for implementing access control to a controlled area having a plurality access areas divided by at least one access point. The program code, which when executed by an intelligent access control system, cause the intelligent access control system to perform the following. A security token is generated. The security token is transmitted to a client module executing on a client device associated with a first user, and the client module is caused to pair with an access control device associated with the first user. The client module is caused to transfer the security token to the access control device. A physical location of the client device within the controlled area is monitored. A determination is made, by an access control system and based upon the physical location, that the first user is to be revalidated. The client module causes, based upon the determining, the client device to generate an alert.

In other aspects, the computer program product includes the security token being regenerated and transmitted to the client module based upon the access control device being used at one of the at least one access point. Also, the transmitting includes transmitting a policy associated with the controlled area to the client module. The determining can be based upon a second user with a second client device being at least a certain distance away from the first client device wherein the first user is a controlling user, and the second user is a controlled user. The determining can also be based upon a time in which the first user is within one of the plurality of access areas. The policy is based upon one of the plurality of access areas in which the first user is located. Additionally, the client module is configured to receive a request to opt into using the intelligent access control system.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1C:
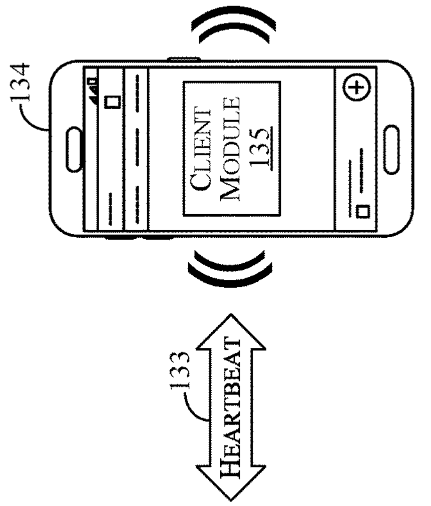
FIG. 1C is a block diagram further illustrating the architecture of an client computer device of FIG. 1A according to an aspect of the present invention.

Reference is made to FIGS. 1A-1C and 2, which respectively illustrate an intelligent access control system 100 and methodology 200 for implementing access control to a controlled area 120 having a plurality access areas A-C divided by at least one access point 140. The intelligent access control system 100 can include an access monitoring system 110, one or more access control devices 116, and a client module 135 executing on one or more mobile client devices 134.

Figure 1B:
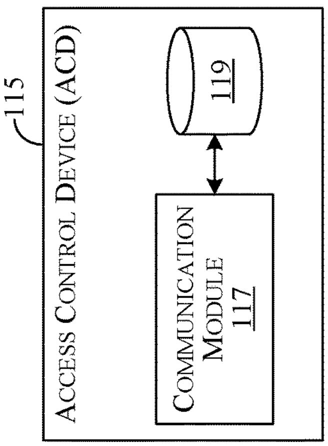
FIG. 1B is a block diagram further illustrating the architecture of an access control device of FIG. 1A according to an aspect of the present invention.

Referring to FIG. 1B, many types of access control devices 116 are currently known, and the access control device (ACD) 116 of the intelligent access control system 110 is not limited to a particular type of access control device 116. Example types of access control devices 116 include, for example, contactless cards and magnetic strip cards. While the access control device 116 communicates with mobile client device 134 using a communication module 117, the access control device 116 is not limited in the manner in which the access control device 116 communicates with the mobile client device 134 using the communication module 117.

Additionally, the access control device 115 includes storage 119 into which data (e.g., a security token in the form of an unique identification number) received from the mobile client device 134 can be stored.

Referring to FIG. 1C, the mobile client device 134 is not limited as to a particular type of mobile client device 134. However, the mobile client device 134 should be capable of being transported (e.g., handheld) by the user 130. Exemplary types of mobile client devices 134 include mobile phones, smart watches, and tablets. The mobile client device 134 also includes a client module 135 associated with the access monitoring system 110. The client module 135 may be a module that already exists on the mobile client device 134 (e.g., such as a native browser that interacts with a server associated with the access monitoring system 110) and/or the client module 135 can be a specialized module that is downloaded onto the mobile client device 134 (e.g., such as a downloadable app).

Additionally, the client module 135 is configured to communicate with the access monitoring system 110 and the access control device 115. The manner in which the client module 135, operating on the mobile client device 134, communicates with the access monitoring system 110 and the access control device 115 is not limited in a particular manner. Moreover, the client module 135, operating on the mobile client device 134, can communicate with the access monitoring system 110 using a different approach than the client module 135 communicates with the access control device 115. Illustrative examples of different communication approaches include near-field communication (e.g., RFID), Bluetooth, and Wi-Fi.

Figure 1A:
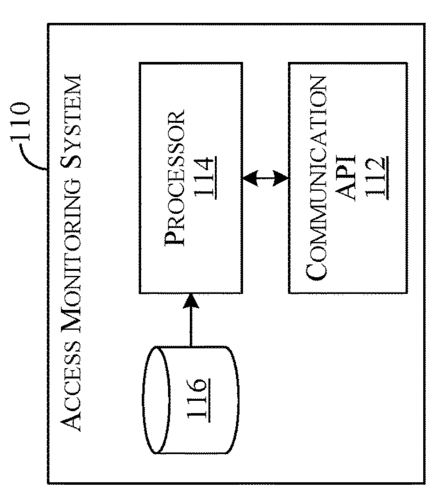
FIG. 1A is a block diagram of an intelligent access system according to an aspect of the present invention.
Figure 1A:
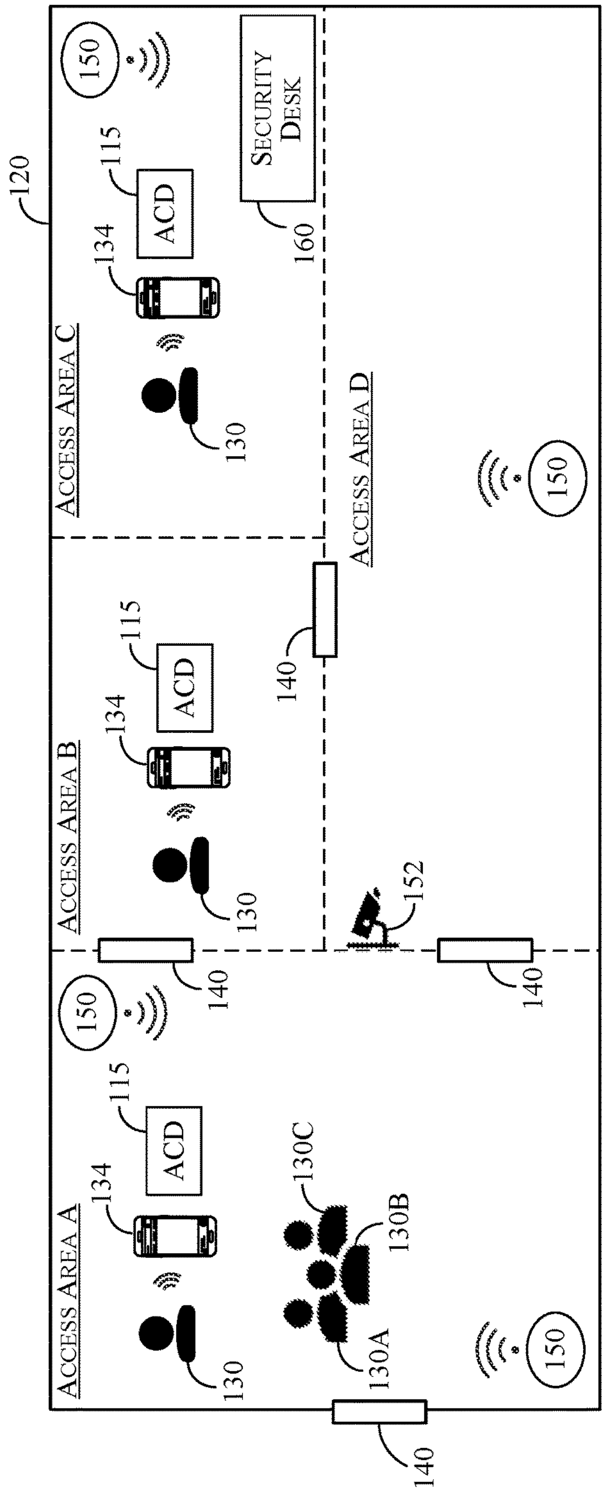
Figure 2:
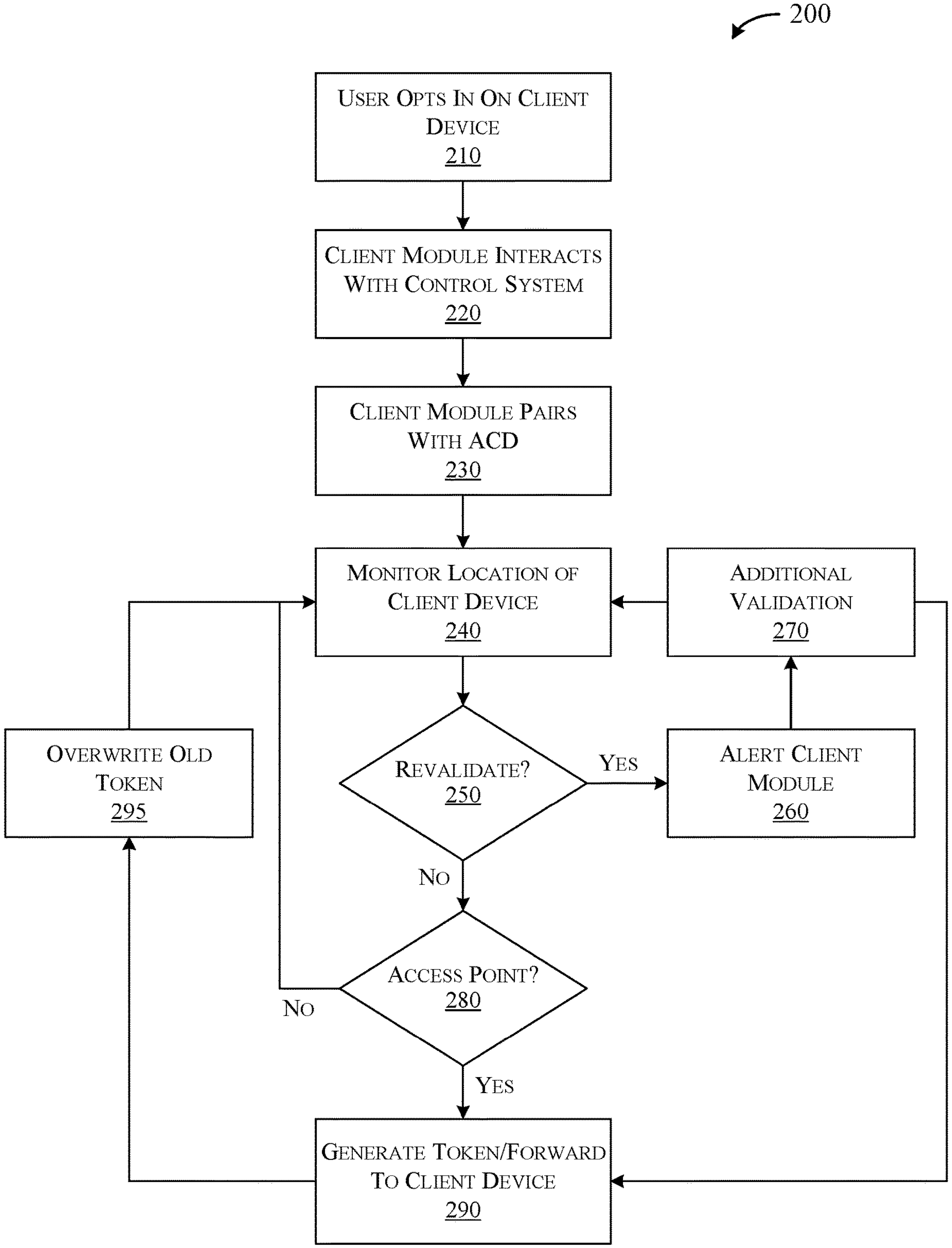
FIG. 2 illustrates a methodology of employing the intelligent access control system of FIG. 1B according to an aspect of the present invention.

Referring specifically to FIGS. 1A and 2, the process 200 of employing the intelligent access control system 100 involves, in 210, a user 130 opting-in using the intelligent access control system 100. This can include the user 130 loading/executing a client module 135 on the mobile client device 134 associated with the user 130. Referring to FIG. 1A, although the present disclosure is discussed with regard to a single user 130, multiple users 130A-C can each have their own mobile client device and their own access control device 115 (not illustrated). The access control devices associated with each of these multiple users 130A-C can be tied to (as controlled access control devices) one or more controlling access control devices (e.g., access control device 130) having different permission levels. By way of example, the controlling access control device 134 could be associated with a tour guide user 130 whereas the controlled access control devices could be associated with visitor users 130A-C.

In 220, once the client module 135 is operational, the client module 135 is configured to interact with the access monitoring system 110. Although not limited in this manner, a session can be established between the client module 135 and the access monitoring system 110 for a predetermined period of time and/or while the user is within the confines of the controlled area 120. Once communication between the client module 135 and the access monitoring system 110 is established, the client module 135 can receive, from the access monitoring system 110, any specific policies associated with the controlled area 120. These policies, for example, can define rules as to how the user 130 is to access certain of Access Areas A-D and/or whether the user 130 can access certain portions of the controlled area 120. Additionally, the client module 135 can be configured to allow the user 130 to set preferences as to how the user 130 is to receive notifications from the accessing monitoring system 110 via the client module 135. For example, a preference may to receive an audible notification and/or a tactile notification (e.g., vibration).

Additionally, the client module 135 can receive a security token in the form of an unique identification (ID) number from the access monitoring system 110 that can be shared by the client module 135, via the client device 134, with the access control device 115. The unique ID number can then be stored by the access control device 115 within storage 119. Since the unique ID number is known by the client module 135, the unique ID number can be used to tie a particular client device 134 to a particular access control device 115. In this manner, a user 130 associated with the particular client device 134 can be tied to the particular access control device 115.

In 230, the client module 135, via the mobile client device 134, is configured to pair with access control device 115. The pairing acts to initiate a communication link between the mobile client device 134 and the access control device 115. This communication link can be periodic, intermittent (e.g., as needed), or substantially continuous. This communication link (i.e., heartbeat 133) can establish that a defined physical proximity exists between the mobile client device 134 and the access control device 115. Operation 230, although depicted as being performed following operation 220, can be performed at the same time (or prior to) operation 220.

In 240, the physical location of the mobile client device 134 (as the user 130 moves through the through the controlled area 120) is monitored by the access monitoring system 110, and the location of the mobile client device 134 acts as a proxy for the location of the user 134. Many different approaches are known capable of determining the location of a particular mobile client device 134 and the intelligent access control system 100 is not limited as to a particular approach so capable. For example, many types of mobile client devices 134 include global position systems (GPS) and the mobile client device 134 can communicate the real-time GPS location of the mobile client device 134 to the access monitoring system 110.

As another example, mobile client devices 134 oftentimes include transmitters that constantly produce signals using Bluetooth, WIFI, and/or LTE bands. The access control system 110 can connect with communication nodes 150 associated with the controlled area 120 and are configured to detect these signals. WIFI and Bluetooth-emitted signal strengths can be typically measured using decibel milliwatts (dBm), a unit used to indicate the power ratio of decibels (dB) with reference to one milliwatt (mW) using the Received Signal Strength Indicator (RSSI). Employing this technique, a distance between a particular communication node 150 and a particular client device 134 can be determined. Through the use of multiple communication nodes 150, an approximate location of the particular client device 134 within the controlled area 120 can be determined.

In 250, a determination is made whether to revalidate the user 130. This determination can be made by the access monitoring system 110, the client module 135, or a combination of both. The basis by which revalidation is determined to be necessary can vary. Revalidation may be based upon a particular location of the user. For example, based upon the location information determined in 240, the user 130 may have entered a restricted area. Alternatively, a controlled user 130A may have wandered too far away from a controlling user 130. In an another example, the revalidation may be based upon time. For example, revalidation may occur after a particular amount of time (e.g., a tour the last 2 hours may require revalidation after 2 hours and 15 minutes) or during a preset period of time (e.g., a sensitive area may be viewed during after-hours). Although not limited in this manner, the basis can be associated with the policy loaded from the accessing monitoring system 110 into the client module 135.

In 260, once a determination has been made that revalidation is needed, the client module 135 of the mobile client device 134 is configured to prompt the user 130 for additional security measures (i.e., revalidation). If the access monitoring system 110 performs the determination, the access monitoring system 110 can communicate with the client module 135 of the mobile client device 134 to perform the prompting. The manner in which the user 130 is prompted is not limited as to a particular approach and can be controlled by the policy. For example, the mobile client device 134 can issue an audio or tactile alert. In addition to (or alternatively), the prompt can take the form of a visual alert on the mobile client device 134 (such as a pop-up window). Additionally, depending upon the determination, the user 130 may be directed to a security location (e.g., an access point 140, security camera 152, or security desk 160) or if the user is a controlled user 130A (e.g., visitor), the controlled user 130A may be directed to check in with the controlling user 130A (e.g., tour guide).

In 270, the user 130 is validated, which involves the user 130 being physically present at a security location (e.g., an access point 140, security camera 152, or security desk 160) or a controlled user 130A checking in with the controlling user 130A. The manner in which the user 130 is validated can vary and is not limited to a particular approach. For example, the user 130 may be required to present the access control card 134 at an access point 140, or allow the user's image to be scanned by the security camera 152, or have the user's identification be confirmed (e.g., visually, electronically, physically such as a thumbprint) at a security desk 160. Regardless of the approach, the revalidation of the user 130 is a security check that reestablishes the identity and/or current location of the user 130 to the access monitoring system 110.

In 280, a determination is made whether the user 130 uses the access control card 134 to check into one of the access points 140. Using an access control card 134 to check into an access point 140 is a known technology, and the access control system 110 is not limited as to any particularly technology so capable. At the time of the access control device 116 being used at an access point 140, the access control system 110 can confirm that the security token stored within the storage 119 of the access control device 110 matches the security token associated with the user 130 (e.g., by comparing the security token contained within the mobile client device 134 that is associated with the user 130). If the user 130 does not encounter an access point 140, the process 200 loops back to 240 to monitor a location of the client device 134.

In 290, after the access control card 134 has accessed one of the access points 140, in 280, the access control system 110 can optionally generate a new security token and forward the security token to the mobile client device 134. The access control system 110 can also forward, to the client module 135 of the mobile client device 134, a specific policy associated with the access area within the controlled area 120 being accessed by the user 130. For example, as the user 130 moves from access area A to access area B through the access point 140 between these two access areas A, B, then a policy associated with access area B can be provided to the client module 135. The operations of 290 can also occur after/during the revalidation of the user in operation 270.

In 295, the client module 135, via the client device 134, communicates the new security token to the access control device 115, and the access control device 115 can cause the old security token stored within storage 119 to be overwritten. Additionally, the client module 135 can use the new policy associated with the new access area. For example, the client module 135 can use the new policy to alert the user of any particular security requirements (e.g., to physically check in at a particular location or inform the user of restricted hours for that location such as a user cannot be present in the new access area from the hours of 9:00 PM to 6:00 AM). The new policy can be used, for example, to present the user with a map of the new access area that would not have been otherwise been made available. The policy can also be used to establish, in instances where there is a controlling user 130 and controlled users 130A-C, that a controlled user 130A (e.g., a visitor) is required to be within a predetermined distance from the controlling user 130 (e.g., the guide), and this predetermined distance can vary depending upon the particular access area.

Once the new security token has been stored within the storage 119 of the access control device 115, the process 200 loops back to 240 to monitor a location of the client device 134.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

Figure 3:
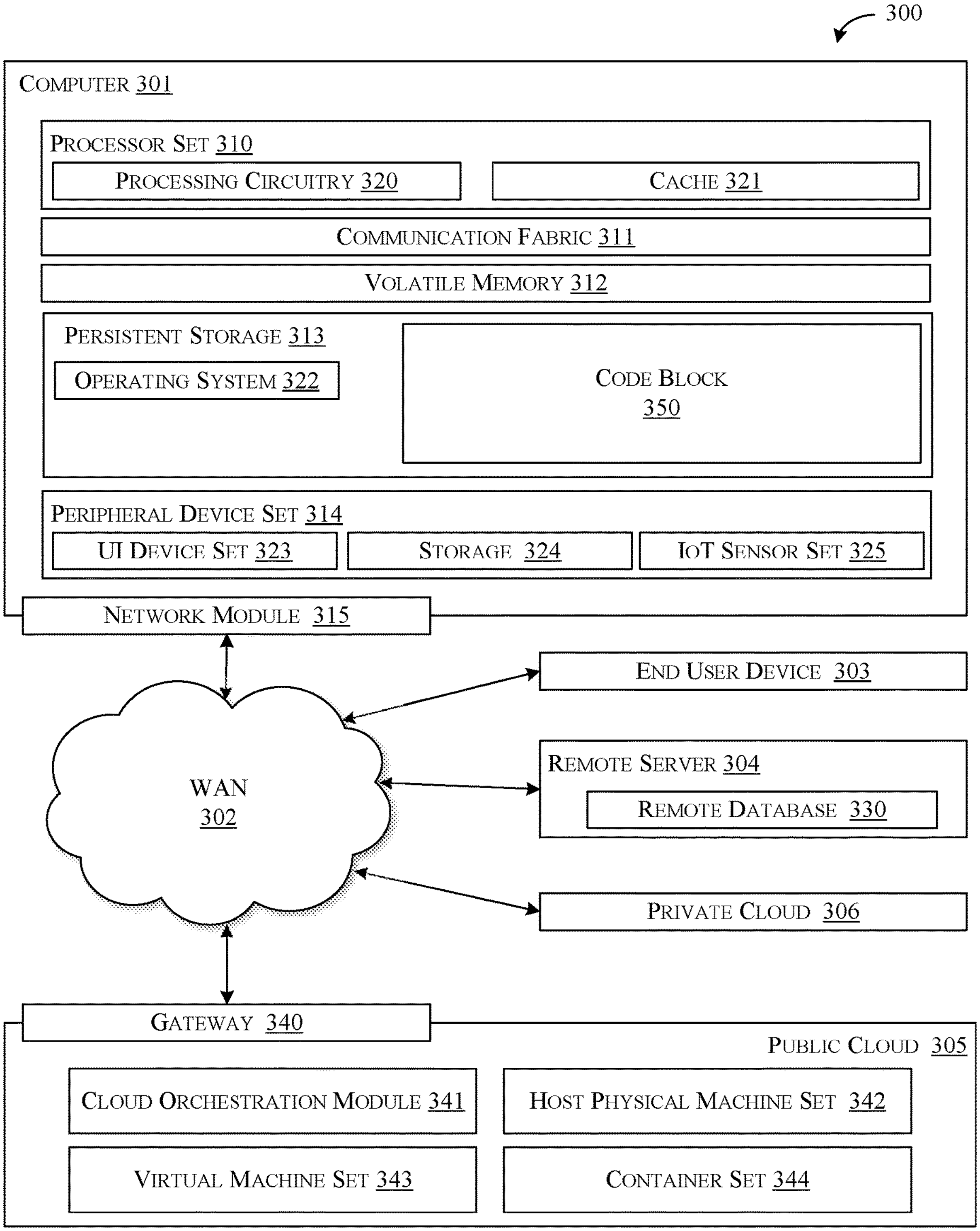
FIG. 3 is a block diagram illustrating an example of computer hardware system for implementing the intelligent access control system of FIG. 1A.

Referring to FIG. 3, computing environment 300 contains an example of an environment for the execution of at least some of the computer code involved in performing the inventive methods, such as code block 350 for implementing the operations of the access monitoring system 110 and the client module 135. Computing environment 300 includes, for example, computer 301, wide area network (WAN) 302, end user device (EUD) 303, remote server 304, public cloud 305, and private cloud 306. In certain aspects, computer 301 includes processor set 310 (including processing circuitry 320 and cache 321), communication fabric 311, volatile memory 312, persistent storage 313 (including operating system 322 and method code block 350), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. However, to simplify this presentation of computing environment 300, detailed discussion is focused on a single computer, specifically computer 301. Computer 301 may or may not be located in a cloud, even though it is not shown in a cloud in FIG. 3 except to any extent as may be affirmatively indicated.

Processor set 310 includes one, or more, computer processors of any type now known or to be developed in the future. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In certain computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods discussed above in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in code block 350 in persistent storage 313.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible, hardware device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing.

A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Communication fabric 311 is the signal conduction paths that allow the various components of computer 301 to communicate with each other. Typically, this communication fabric 311 is made of switches and electrically conductive paths, such as the switches and electrically conductive paths that make up busses, bridges, physical input/output ports and the like. Other types of signal communication paths may be used for the communication fabric 311, such as fiber optic communication paths and/or wireless communication paths.

Volatile memory 312 is any type of volatile memory now known or to be developed in the future. Examples include dynamic type random access memory (RAM) or static type RAM. Typically, the volatile memory 312 is characterized by random access, but this is not required unless affirmatively indicated. In computer 301, the volatile memory 312 is located in a single package and is internal to computer 301. In addition to alternatively, the volatile memory 312 may be distributed over multiple packages and/or located externally with respect to computer 301.

Persistent storage 313 is any form of non-volatile storage for computers that is now known or to be developed in the future. The non-volatility of the persistent storage 313 means that the stored data is maintained regardless of whether power is being supplied to computer 301 and/or directly to persistent storage 313. Persistent storage 313 may be a read only memory (ROM), but typically at least a portion of the persistent storage 313 allows writing of data, deletion of data and re-writing of data. Some familiar forms of persistent storage 313 include magnetic disks and solid state storage devices. Operating system 322 may take several forms, such as various known proprietary operating systems or open source Portable Operating System Interface type operating systems that employ a kernel. The code included in code block 350 typically includes at least some of the computer code involved in performing the inventive methods.

Peripheral device set 314 includes the set of peripheral devices for computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet.

In various aspects, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some aspects, storage 324 may take the form of a quantum computing storage device for storing data in the form of qubits. In aspects where computer 301 is required to have a large amount of storage (for example, where computer 301 locally stores and manages a large database) then this storage 324 may be provided by peripheral storage devices designed for storing very large amounts of data, such as a storage area network (SAN) that is shared by multiple, geographically distributed computers. Internet-of-Things (IoT) sensor set 325 is made up of sensors that can be used in IoT applications. For example, one sensor may be a thermometer and another sensor may be a motion detector.

Network module 315 is the collection of computer software, hardware, and firmware that allows computer 301 to communicate with other computers through a Wide Area Network (WAN) 302. Network module 315 may include hardware, such as modems or Wi-Fi signal transceivers, software for packetizing and/or de-packetizing data for communication network transmission, and/or web browser software for communicating data over the internet. In certain aspects, network control functions and network forwarding functions of network module 315 are performed on the same physical hardware device. In other aspects (for example, aspects that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any Wide Area Network (for example, the internet) capable of communicating computer data over non-local distances by any technology for communicating computer data, now known or to be developed in the future. In some aspects, the WAN 302 ay be replaced and/or supplemented by local area networks (LANs) designed to communicate data between devices located in a local area, such as a Wi-Fi network. The WAN 302 and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In certain aspects, EUD 303 may be a client device, such as thin client, heavy client, mainframe computer, desktop computer and so on.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein. As defined herein, the term "user" means a person (i.e., a human being).

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304. As defined herein, the term "server" means a data processing system configured to share services with one or more other data processing systems.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305.

The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

VCEs can be stored as "images," and a new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other aspects, a private cloud 306 may be disconnected from the internet entirely (e.g., WAN 302) and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this aspect, public cloud 305 and private cloud 306 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

As another example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Each block in the flowchart or block diagrams may represent a module, segment, or portion of instructions, which comprises one or more executable instructions for implementing the specified logical function(s).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "if," "when," "upon," "in response to," and the like are not to be construed as indicating a particular operation is optional. Rather, use of these terms indicate that a particular operation is conditional. For example and by way of a hypothetical, the language of "performing operation A upon B" does not indicate that operation A is optional. Rather, this language indicates that operation A is conditioned upon B occurring.

The foregoing description is just an example of embodiments of the invention, and variations and substitutions. While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented method, by an intelligent access control system, of implementing access control to a controlled area having a plurality of access areas divided by at least one access point, the computer-implemented method comprising:

generating a security token;

transmitting the security token to a client module executing on a first client device associated with a first user;

causing the client module to pair with an access control device associated with the first user;

causing the client module to transfer the security token to the access control device;

monitoring a physical location of the first client device within the controlled area; and determining, based on the physical location of the first client device, that the first user is to be validated, wherein the client module causes, based on the determining that the first user is to be validated, the first client device to generate an alert.

2. The computer-implemented method of claim 1, wherein the security token is regenerated and transmitted to the client module based on the access control device being used at one of the at least one access point.

3. The computer-implemented method of claim 1, wherein the transmitting of the security token includes transmitting a policy associated with the controlled area to the client module.

4. The computer-implemented method of claim 1, wherein:

the determining that the first user is to be validated is based on a second user with a second client device being at least a certain distance away from the first client device, the first user is a controlling user, and the second user is a controlled user.

5. The computer-implemented method of claim 1, wherein the determining that the first user is to be validated is based on a time in which the first user is within one of the plurality of access areas.

6. The computer-implemented method of claim 1, wherein a policy is based on one of the plurality of access areas corresponding to the physical location of the first user.

7. The computer-implemented method of claim 1, further comprising receiving, from the client module, a request to opt into using the intelligent access control system.

8. An intelligent access control system configured to implement access control to controlled area having a plurality of access areas divided by at least one access point, intelligent access control system comprising:

a hardware processor configured to perform operations comprising:

generating a security token;

transmitting the security token to a client module executing on a first client device associated with a first user;

causing the client module to pair with an access control device associated with the first user;

causing the client module to transfer the security token to the access control device;

monitoring a physical location of the first client device within the controlled area; and determining, based on the physical location of the first client device, that the first user is to be validated, wherein the client module causes, based on the determining that the first user is to be validated, the first client device to generate an alert.

9. The intelligent access control system of claim 8, wherein the security token is regenerated and transmitted to the client module based on the access control device being used at one of the at least one access point.

10. The intelligent access control system of claim 8, wherein the transmitting of the security token includes transmitting a policy associated with the controlled area to the client module.

11. The intelligent access control system of claim 8, wherein the determining that the first user is to be validated is based on:

a second user with a second client device being at least a certain distance away from the first client device;

the first user is a controlling user; and the second user is a controlled user.

12. The intelligent access control system of claim 8, wherein the determining that the first user is to be validated is based on a time in which the first user is within one of the plurality of access areas.

13. The intelligent access control system of claim 8, wherein a policy is based on one of the plurality of access areas corresponding to the physical location of the first user.

14. The intelligent access control system of claim 8, wherein the operations further comprise receiving, from the client module, a request to opt into using the intelligent access control system.

15. A computer program product, comprising:

a computer readable storage medium having stored therein program code for implementing access control to a controlled area having a plurality of access areas divided by at least one access point, the program code, which when executed by an intelligent access control system, causes the intelligent access control system to perform operations comprising:

generating a security token;

transmitting the security token to a client module executing on a first client device associated with a first user;

causing the client module to pair with an access control device associated with the first user;

causing the client module to transfer the security token to the access control device;

monitoring a physical location of the first client device within the controlled area; and determining, based on the physical location of the first client device, that the first user is to be validated, wherein the client module causes, based on the determining that the first user is to be validated, the first client device to generate an alert.

16. The computer program product of claim 15, wherein the security token is regenerated and transmitted to the client module based on the access control device being used at one of the at least one access point.

17. The computer program product of claim 15, wherein the transmitting of the security token includes transmitting a policy associated with the controlled area to the client module.

18. The computer program product of claim 15, wherein the determining that the first user is to be validated is based on:

a second user with a second client device being at least a certain distance away from the first client device;

the first user is a controlling user; and the second user is a controlled user.

19. The computer program product of claim 15, wherein the determining that the first user is to be validated is based on a time in which the first user is within one of the plurality of access areas.

20. The computer program product of claim 15, wherein a policy is based upon one of the plurality of access areas corresponding to the physical location of the first user.

* * * * *